US012482360B2

(12) United States Patent
Kanthimathinathan (10) Patent No.: US 12,482,360 B2
(45) Date of Patent: Nov. 25, 2025

(54) AUTOMATED PROVISIONING AND CONTROL OF TELEMATICS OEM SERVICES

(71) Applicant: Nesh Technologies Private Limited, Tamil Nadu (IN)

(72) Inventor: Venkatachalam Kanthimathinathan, Tamil Nadu (IN)

(73) Assignee: NESH TECHNOLOGIES PRIVATE LIMITED, Tamil Nadu (IN)

( * ) Notice: Subject to any disclaimer, the term of this patent is extended or adjusted under 35 U.S.C. 154(b) by 387 days.

(21) Appl. No.: 17/407,904

(22) Filed: Aug. 20, 2021

(65) Prior Publication Data

US 2023/0058660 A1    Feb. 23, 2023

(51) Int. Cl.
*G08G 1/00*    (2006.01)
*G01S 19/14*   (2010.01)
*G07C 5/00*    (2006.01)
*G08G 1/127*   (2006.01)
*H04Q 9/00*    (2006.01)

(52) U.S. Cl.
CPC ............... *G08G 1/20* (2013.01); *G01S 19/14* (2013.01); *G07C 5/008* (2013.01); *G08G 1/127* (2013.01); *H04Q 9/00* (2013.01)

(58) Field of Classification Search
CPC .......... G08G 1/20; G08G 1/127; G01S 19/14; G07C 5/008; H04Q 9/00
See application file for complete search history.

(56) References Cited

U.S. PATENT DOCUMENTS

| | | |
|---|---|---|
| 7,398,082 B2 | 7/2008 | Schwinke et al. |
| 8,160,547 B2 | 4/2012 | Yi et al. |
| 8,306,560 B2 | 11/2012 | Krause et al. |
| 8,857,705 B2 | 10/2014 | Larson et al. |
| 9,148,743 B2 | 9/2015 | Timm et al. |
| 9,767,697 B2 | 9/2017 | Rockett et al. |
| 9,775,562 B2 | 10/2017 | Egner et al. |
| 10,027,805 B2 | 7/2018 | Husain et al. |
| 10,706,642 B2 | 7/2020 | Throop et al. |
| 2004/0203692 A1 | 10/2004 | Schwinke et al. |

(Continued)

OTHER PUBLICATIONS

Xu, Wenchao, et al. "Internet of vehicles in big data era." IEEE/CAA Journal of Automatica Sinica 5.1 (2018): 19-35.

*Primary Examiner* — Anne Marie Antonucci
*Assistant Examiner* — Patrick M Brady
(74) *Attorney, Agent, or Firm* — Farber LLC; Jonathan A. Winter (57) ABSTRACT

A system and method which enables a telematics server and its software to modify telematics device behavior based on the provisioned telecommunications plan depending on the context of the telematics device. The context may be the location, stage of manufacturing process for the device/equipment that the telematics device is fitted to (e.g. a vehicle), the speed, status of various sensors and others. This information is used to both modify device behavior in terms of how often and what is communicated to the telematics server but is also useful in modifying and provisioning new plans for the telematics device (with appropriate transmission configurations matched to the plan). The foregoing allows the telematics device to avoid operating in a way that exceeds telecom plan thresholds and limits.

18 Claims, 7 Drawing Sheets

(56) References Cited

U.S. PATENT DOCUMENTS

| | | | |
|---|---|---|---|
| 2006/0132330 A1* | 6/2006 | Youn | H04Q 9/00 |
| | | | 340/870.07 |
| 2006/0136106 A1* | 6/2006 | Patenaude | B60R 16/0231 |
| | | | 307/10.1 |
| 2008/0294690 A1 | 11/2008 | McClellan et al. | |
| 2009/0287499 A1 | 11/2009 | Link, II | |
| 2010/0228404 A1 | 9/2010 | Link, II et al. | |
| 2012/0196585 A1* | 8/2012 | Przybylski | H04W 8/245 |
| | | | 455/418 |
| 2012/0302262 A1* | 11/2012 | Bruce | H04W 4/50 |
| | | | 455/551 |
| 2014/0187195 A1* | 7/2014 | Pallares Lopez | H04L 12/1407 |
| | | | 455/405 |
| 2014/0248852 A1* | 9/2014 | Raleigh | H04W 12/068 |
| | | | 455/566 |
| 2015/0128123 A1* | 5/2015 | Eling | G07C 5/008 |
| | | | 717/171 |
| 2015/0279125 A1* | 10/2015 | Chronowski | G07C 5/008 |
| | | | 701/29.2 |
| 2018/0047107 A1 | 2/2018 | Perl et al. | |
| 2021/0390800 A1* | 12/2021 | Chafekar | B60L 53/16 |
| 2022/0070699 A1* | 3/2022 | Thiyagarajan | H04W 24/04 |
| 2022/0232130 A1* | 7/2022 | Kauffman | H04W 4/24 |
| 2023/0005305 A1* | 1/2023 | Sakurai | G06F 13/00 |
| 2023/0373495 A1* | 11/2023 | Kallepalle | H04N 7/188 |

* cited by examiner

AUTOMATED PROVISIONING AND CONTROL OF TELEMATICS OEM SERVICES

FIELD OF THE INVENTION

The present invention relates to systems and methods for controlling use of telecommunications services by telematics devices as well as provisioning and registering telematics devices as part of an OEM assembly line fitment process and distribution network.

BACKGROUND OF THE INVENTION

Telematics devices provide integrated use of telecommunications and information systems, typically for vehicles, but are also being used in a variety of devices such as refrigerators, microwaves and other household and commercial appliances.

These telematics devices are capable of various measurement tasks along with subsequent data transmission, receipt, usage, processing, and storage. The telematics devices along with a global positioning system are integrated with computers and mobile communications technologies. The telematics device when fitted in vehicles collect the engine, driver, other sensor and location data to send to a telematics remote server for further processing to generate alerts and reports.

This data, although very useful to vehicle owners and especially large fleet operators, comes with a cost. Furthermore, throughout the supply chain process from manufacture to delivery of the vehicle, the devices will change hands many times and will often be stationary in a parking lot for a period of time, potentially incurring un-needed data plan expenses or causing expensive overages.

Schwinke, in U.S. Pat. No. 7,398,082 provides a method and system for configuring a telematics unit in a mobile vehicle. An assigned system identifier is stored in the telematics unit, and a determination is made as to whether the assigned system identifier corresponds to a broadcast system identifier. A wireless carrier is called based on the determination, and a mobile identification number is received from the wireless carrier. This reference is focused on activating the device at the end user point or the dealer's lot and does not address the activities prior to this time.

Yi in U.S. Pat. No. 8,160,547 relates to a system and method for making vehicle originated calls to a telematics service provider or other call center. The method includes identifying a call type associated with a desired wireless communication of speech or data to the call center, and then carrying out one of a number of different call connection processes depending on the call type. For voice channel cellular connections, an in-band modem cellular connection is preferably established in most instances using a connection retry strategy that includes primary, secondary, and possibly tertiary connection attempts. Cell selection can be carried out using an acquisition task, background scan and inter-country PLMN reselection process that are used to select among available PLMNs and base stations. The system and method can be carried out in connection with various cellular system technologies, but is especially suited for use with GSM systems. Yi's teaching applies to situations after the sale of the vehicle, such as collision detection initiating a voice call to a call center or vice versa using various connection means. It does not teach the initial factory level connectivity-test, nor does it look at different plan options to use at various stages or on controlling the telematics device in a manner that avoids overages. It relies on a fully functional plan to establish the connections and tried different means only because establishing connectivity can vary depending on the vehicle's location.

Accordingly, there is a need for an improved system to manage telematics devices throughout the manufacturing and supply chain in an efficient manner that makes use of the data the devices have to offer without excessive cost to be able to use such data.

SUMMARY OF THE INVENTION

It is therefore an object of the invention to have a way to install and provision telematics services at the factory, rather than downstream in the dealer network and to manage these devices efficiently by regularly updating the device behavior depending on context of where the vehicle/device is and what it is doing and/or what is known about the particular location or area where the device is located.

It is a further object to have telematics services available on the assembly line for tracking assembly progress, capturing and distributing diagnostic information and vehicle location to central systems as the vehicle moves about the factory and into the stockyard.

It is a further object to intelligently control what data is sent by the device based on the context of where it is and what plan is selected.

The present invention is directed to systems and methods for managing telematics services in the vehicle manufacturing process.

Accordingly, there exists a need for a system and a method to better provision and manage telematics services. Further, there exists a need for all stakeholders of the OEM's telematics ecosystem system to collaborate effectively for supply, fitment, activation, suspension, resumption, and ongoing support of the telematics service.

These and other objects are achieved by providing a system which enables a telematics server and its software to modify telematics device behavior based on the provisioned telecommunications plan depending on the context of the telematics device. The context may be the location, stage of manufacturing process for the device the telematics device is fitted to (e.g. a vehicle), the speed, status of various sensors and others. This information is used to both modify device behavior in terms of how often and what is communicated to the telematics server but is also useful in modifying and provisioning new plans for the telematics device (with appropriate transmission configurations matched to the plan). The foregoing allows the telematics device to avoid operating in a way that exceeds telecom plan thresholds and limits.

In one aspect, a system for modifying telematics device behavior is provided. The system includes a server having software executing thereon which is configured to communicate with a plurality of telematics devices over a network. The software is in communication with a storage and further in communication with one or more telecommunications provider servers. The storage contains data indicative of the plurality of telematics devices and associated telecommunications plans for one or more of said plurality of telematics devices. Each of the telematics devices is capable of measuring and transmitting data from a plurality of sensors and the software receives a signal from one or more telematics devices, the signal indicative of a power up of the one or more telematics devices. The telematics devices conduct a connectivity test and thereby transmitting a signal and said software, in response to said signal, sending instructions to the one or more telematics devices, the instructions indicative of one or more of: data for the one or more telematics devices to transmit and frequency of transmission.

In further aspects the frequency associated with the instructions can be further indicative of one or more conditions to cause transmission of data from said one or more telematics devices to the server. In certain aspects the one or more conditions is selected from the group consisting of: the telematics device has left a geo fence area, the one or more telematics devices are connected to power after an internal battery was previously emptied, the telematics device has entered a known geo fence area, a GPS module in the telematics device indicates movement more than a threshold speed and combinations thereof. In other aspects, in response to the signal, the software provisions one or more telematics devices with a telecommunications plan by communicating with one of the one or more telecommunications provider servers, said software associating the telecommunications plan with the one or more telematics devices. In further aspects, the software receives a second signal from the one or more telematics devices, the second signal indicative of the one or more telematics devices having been installed in a vehicle and said software, based on said second signal, provisioning the one or more telematics devices with a second telecommunications plan and said software sending second instructions to the one or more telematics devices to revise the instructions concerning data for the one or more telematics devices to transmit and frequency of transmission, the second instructions matched to the second telecommunications plan to inhibit the telematics device from using data beyond that which is allotted by the second telecommunications plan.

In yet further aspects, based on data received from the one or more telematics devices via said network at the server, the software sends third instructions to the one or more telematics devices, the third instructions revising the second instructions concerning data for the one or more telematics devices to transmit and frequency of transmission. In yet other aspects, a new telecommunications plan is provisioned with the one or more telematics devices after the software receives confirmation indicating that the one or more telematics devices is operating based on the third instructions. In still other aspects the one or more telecommunications devices is provisioned with a bootstrap plan or a pooled bootstrap plan.

Yet other objects are achieved by providing A method of modifying telematics device behavior. The method includes one or more of the steps of: providing software executing on a server, the server in communication with a plurality of vehicle telematics devices via a network; at the software, receiving data from each of the plurality of vehicle telematics devices; determining with the software, based on the data, that one of the plurality of vehicle telematics devices is installed in a vehicle; determining with the software, based on the data which includes GPS information, a position of the vehicle and based on the position transmitting via the software instructions to the one of the plurality of vehicle telematics devices, the instructions indicative of a reporting frequency and one or more data fields for the one of the plurality of telematics devices to transmit to the server; determining with the software, based on the data which includes GPS information, that the vehicle has moved and based on a second position of the vehicle sending second instructions to change the instructions such that the reporting frequency and/or the one or more data fields for the one of the plurality of telematics devices to transmit to the server are modified.

In other aspects the method may include communicating via the software with one or more telecommunications servers to provision the one of the plurality of vehicle telematics devices with a new telecommunications plan sized based on the instructions and the second instructions. In yet other aspects the method may include, with the software, determining that the vehicle is delivered to the end user and provisioning the one of the plurality of vehicle telematics devices with a new telecommunications plan and sending third instructions for modifying the reporting frequency and/or the one or more data fields the one of the plurality of telematics devices to transmits to the server.

In yet other aspects the third instructions cause all end user selected and available data fields to be transmitted from the one of the plurality of telematics devices to the server. In other aspects based on GPS information of the vehicle delivered to the end user and an amount of usage of the third telecommunications plan, the software determines yet another new telecommunications plan which has a reduced cost compared to the yet another new telecommunications plan and the software communicates with the telecommunications provider server to provision the yet another new telecommunications plan.

Other objects are achieved by providing a system for modifying telematics device behavior. The system includes a server having software executing thereon which is configured to communicate with a vehicle telematics device over a network, said software in communication with a storage and further in communication with one or more telecommunications provider servers, said storage containing data indicative of the vehicle telematics device and an associated first telecommunications plan for said vehicle telematics device. The vehicle telematics device is capable of measuring and transmitting data from a plurality of sensors, said data including position data from a GPS device and vehicle data and transmit information to the server with a reporting frequency, the information including data from at least one of the plurality of sensors. The software further receives a signal from the telematics device, the signal indicative of one of the plurality of sensors detecting a change in state of a vehicle in which the telematics device is installed and based on the change in state, the software sends instructions to the telematics device such that the telematics device transmits and the server and software receives information from the telematics device with a second reporting frequency and the information including data from one or in some embodiments at least two of the plurality of sensors.

In other aspects, the software provisions the telematics device with a new telecommunications plan by communicating with one of the one or more telecommunications provider servers, the new telecommunications plan selected based on a selection indicative that an end user has taken delivery of the vehicle. In yet other aspects, the software provisions the telematics device with a new telecommunications plan by communicating with one of the one or more telecommunications provider servers, said software associating the new telecommunications plan with the one or more telematics devices in the storage and the new telecommunications plan having a higher data limit than the telecommunications plan, the new telecommunications plan is matched to the one more telematics devices based on the second reporting frequency and the information received with that second reporting. In other aspects the first telecommunications plan is a bootstrap plan. In still other aspects, the change in state is indicative of the vehicle's engine being turned on and a change in position of the vehicle as determined by a GPS. In further aspects, the change in state is indicative of a change in position of the vehicle as determined by a GPS which is more than a predetermined distance or more than a predetermined distance relative to a time between two reports according to the reporting frequency. In still other aspects, the change in state is indicative of a change in position of the vehicle as determined by a GPS to a position outside of a geofence. In still other aspects, the first telecommunications plan is provisioned while the vehicle is parked in a parking lot prior to transportation, the second telecommunications plan is provisioned while the vehicle is transported and the third telecommunications plan is provisioned after transportation to a dealer.

In yet other aspects, while the first telecommunications plan is provisioned, the reporting frequency is no more than three times per 24 hour period and the data excludes information from a majority of the plurality of sensors. In other aspects, the selection is received from a vehicle dealer. In still other aspects, based on GPS information of the vehicle delivered to the end user and an amount of usage of the third telecommunications plan, the software determines a fourth telecommunications plan which has a reduced cost compared to the third telecommunications plan and the software communicates with the telecommunications server to provision the fourth telecommunications plan.

Other objects and features of the present invention will become apparent from considering the following description and accompanying drawings.

DETAILED DESCRIPTION OF THE INVENTION

The invention relates to the process and a system for collaboration amongst key stakeholders in the telematics ecosystem, namely the automotive manufacturers, telematics device suppliers, SIM (Subscriber Identification Module) supplied by telecom service providers, telematics service providers (TSPs), vehicle dealers, service centers and vehicle owners towards preparation, fitment, testing, service activation, usage and ongoing support of telematics devices fitted in the automotive assembly line. The system proposed comprises of a cloud-based Telematics Server working in conjunction with a network of telematics devices to enable the assembly line fitment and its management thereof. The system uses location awareness and incorporates machine learning to manage telematics service availability and plans as well as device reporting frequency and selection of transmitted parameters leading to an optimized service cost through the various stages of manufacturing assembly line until the delivery of the vehicle to the end customer.

Additionally, the telematics device typically comprises a storage with an embedded software and a SIM provided by the telecom service providers. The telematics device may have its own GPS device/sensor or may draw data from another vehicle system having a GPS. The telematics device and the telematics server combine to provide the telematics service. The service providers who launch and offer telematics services are called TSP's (Telematics Service Providers). TSP's may offer telematics services through OEM's, device suppliers, dealers, service centers or may directly deal with the supply, fitment, and maintenance. In some cases, the OEM's or one of the telematics stakeholders may themselves function as TSP's.

In recent years, due to road and passenger safety regulations combined with vehicle emission monitoring needs, the OEM's have begun fitment of telematics devices in vehicles in the assembly line of the factory like any other automotive component. Additionally, the market for connected vehicle solutions and shared mobility use cases further accelerates this trend. The OEMs are also keen to leverage factory fitted telematics devices for improved vehicle stockyard management, monitoring of vehicles during transit to dealers and to collect critical vehicle and engine data for product improvements and supply chain initiatives. However, the installation of these devices creates a problem in management of data use in that if not managed correctly, the cost of overages can rapidly reduce the manufacturer's profit margin.

OEMs use an assembly line in factories to manufacture vehicles. The workers in the assembly line are responsible to fit one or more automotive components in the vehicle on the assembly line. Once a vehicle is produced in the assembly line, it goes through quality control tests and then parked in the OEM's stockyard before being dispatched to various vehicle dealers for sales to purchasing customers or fleet owners.

It is the purpose of the present invention to aid the OEM to be able to seamlessly onboard thousands of new vehicles with telematics services as well as ensure that usage is controlled and matched to the needs of any particular stage of the manufacturing and supply chain process.

A deterrent to doing the configuration and provisioning of the telematics devices as OEM line fitment has been cost, as it is unclear how long vehicles remain in the stockyard or even at the dealer's lot before being sold, upon which time the paid services transfer to the end user, or purchaser of the vehicle. While OEMs would benefit from having the telematics service active on the manufacturing floor to collect data, the cost deterrent of activating a plan and not knowing how long the vehicle will remain in inventory has outweighed the benefits of early provisioning. Further, chatty devices can run up telecom bills rapidly and the lack of control over what information is sent can lead to unexpectedly large communications bills.

In addition to the connectivity over the SIM and the provisioning of the plans to enable such communications, Telematics systems are also increasingly provisioned in the cloud and also offer licensing tiers based on connection attempts or duration. The access to these systems for testing may also be done by the device manufacturers, who run their own connectivity tests in their environment prior to shipping the devices.

Once dispatched, the device itself may very well sit in inventory on a shelf for an undetermined amount of time where there is no requirement to connect and thus no plan required for the SIM to connect to the network or to connect to the telematics software. The provisioning and enablement of these plans is triggered by the initial power-up. Subsequently plan selection and enablement are made through knowledge of variables such as the location, relative position within predetermined geofences, the number and type of connected devices, i.e., the volume of data to be transmitted and how often.

The system and method propose a system which uses location awareness and machine learning to detect various stages in the assembly process and automatically adjusts device behavior and reporting to match the limits of a particular data plan or may optionally provision the telematics services with the optimal communications plan based on device location and stage of manufacturing. The instructions concerning reporting frequency and data to report would then be matched to whatever plan is provided for the device. This allows the provisioning of basic and lower cost plans during manufacturing and switching to the final plan when the vehicle arrives on the dealer's lot (or is sold). Further, as the telematics server is in communication with the device, it also instructs the device regarding which parameters to send and at what frequency based on the plan which has been provisioned. By having rudimentary telematics data available throughout the manufacturing process, the OEM is also able to leverage this data and get value added information about the assembly line. The factory installation and configuration are also less error prone than is doing these functions downstream in the dealer network.

An embedded software program runs autonomously and continuously in the telematics device tracking the process through the assembly line. The system is first initiated by the assembly plant workers upon installation into the vehicle.

The embedded software is present on all telematics devices. Each device incorporates a SIM and collects data from a variety of sensors, including location information. This embedded software communicates with a cloud-based telematics server.

A cloud-based telematics server is in contact with the fleet of telematics devices receiving telematics data from the devices and runs software to manage these devices. This cloud-based telematics server is knowledgeable about the available plans and pricing from appropriate telecom service providers and performs the provisioning process for the SIM's present in the telematics devices. Further, it provides instructions pertaining to reporting frequencies and telematics parameters to be sent.

This embedded software program in the telematics device may be knowledgeable about the vehicle, the current state of assembly, the location. It may also be privy to diagnostic information as the vehicle is being assembled and tested alleviating the need for many existing test jigs and special devices used for testing.

This embedded software program is in contact with a remote centralized software through a cellular connection, and the address of this remote centralized program, or Telematics server, is normally stored and pre-programmed into the device SIM.

The embedded software program also captures location information, which can include reading from built in GPS circuitry or other location type information such as proximity to cellular towers, signal triangulation, Wi-Fi SSID identification, Bluetooth or other signal strength and proximity detection among other methods.

Diagnostic information comes from devices as they are hooked up to the vehicles information bus which is connected to the OBD (On Board Diagnostics) port which powers the telematics device and provides access to this diagnostic information. As such, the embedded software program is able to ascertain some context as to where it is in the production process.

In order to communicate, two types of provisioning must be done for the device and there are multiple options available. First, provisioning the SIM with a telecom data plan is necessary to establish communications over the telecom providers' network. These plans vary from provider to provider, and for the sake of simplicity we will consider a single provider in the examples below. It should be noted that some devices employ dual-SIM systems or programmable SIM systems which allow access to multiple providers or help set providers dynamically. The simplified descriptions relating to a single provider should by no means be considered limiting for the invention described.

A provider may provide differently costed plans that vary by bandwidth used. For example, a basic plan offering only 100 mb of data in a month may be the lowest cost option, whereas a second plan with 300 mb, a third with 1 GB, and a fourth with 10 gb may be offered. Selecting the lowest cost, and lowest data limit plan, has a lower cost however most plans are structured to have large overage costs so that if the device were to use even slightly more than the 100 mb allotted, the cost would exceed that of the next up 200 mb plan. For this reason, proper plan selection and management is key to optimizing costs.

Initially most devices will be provisioned with a bootstrap plan or may be part of a bootstrap pooled plan. A bootstrap plan is typically provided so that the device can communicate with the telecommunications servers so that more robust plans can be provisioned as more data and greater reporting frequency is needed. A pooled bootstrap plan differs from the bootstrap plan in that data usage is pooled among multiple devices. For example, such a play may allow 1,000,000 SIMs to be added to a pool with a limit of 10 gb of usage per month across all.

Early in the manufacturing process, the amount of data usage needed may be initially elevated because of testing or other diagnostics. Later in the manufacturing process, the communications needs may be lower. As an example, after manufacture is complete, the vehicle will often sit in a staging lot for an indeterminate amount of time. In this scenario, a report of position once per day or a report when the ignition is turned on may be enough. Thus the server software will send instructions to the various telematics devices depending on the context of where they are and what they are doing and what data they are capturing. The telematics devices then have instructions for when they are allowed to use data and when they should not use data. As a result, the centralized telematics server has control over all devices on a particular plan and can adjust data usage and/or the plan as needed to match requirements and reduce costs/avoid overages.

A telematics unit reporting in once a day might have a lowest cost, whereas one reporting in every few minutes may have the highest cost. Plans may be structured around the overall number of reporting events or may be based on a maximal reporting frequency in a given timeframe. Many plans are dynamic in nature. For example, for vehicles, when parked, reporting in once a day is sufficient, however once the engine is started, diagnostic information starts to flow, and the reporting frequency is increased. Once movement is detected, then the vehicle would start reporting position more frequently, as speed increases, the reporting frequency increases again.

An important factor is that the remote telematics device is always the one that initiates the communications. The telematics server, or remote cloud system must await reports from the telematics devices before being able to send commands that may reprogram the devices and have them switch plans. Therefore, it is critical for the cloud telematics server to be able to send instructions to the telematics devices to control their operation to ensure that there is not a runaway usage of data which causes expensive overages.

Further, the relationship between the current telecom service provider plan being used and the reporting done by the telematics device is key. For example, when a basic plan with very limited bandwidth has been allocated, the device will not send large amounts of data, or any video or audio data types that require a lot of bandwidth. This interrelationship of reporting frequency, the type of data being reported, and the plan being used is managed by the Cloud based telematics server which provides instructions and controls to the telematics devices.

Take now a vehicle manufacturing and assembly process and how this would relate to the various plans being deployed and provisioned.

Initially, the telematics unit is assembled by the device manufacturer and programmed with the remote telematics server information to pre-program communications for the device. The device manufacturer will want to test this function on their device before shipping it out and this will require connectivity. For such a test, a minimal plan simply allowing for such a quick test is sufficient. Since SIMs are mostly embedded, it is no longer possible to switch out SIMs on a device for such a test so a basic plan must be provisioned to send such a communication and receive the responses. In this case, the telematics server receives the data, reports the device as working, and then send back commands to put the device to sleep and disable the plan.

Next this device is shipped to the vehicle manufacturer and may sit on the shelf for an undetermined amount of time before being installed into a vehicle. During this time, no plan is required, and the device does not communicate with any system and it is desired not pay any monthly plan fees.

Once installed, the device draws power from the OBD connection and will power up following the instructions provided by the telematics server and the preprogrammed addresses set at the device manufacturer's location. The device will connect to the telematics server and will start to collect telematics data and diagnostic data from the vehicle as it is being assembled. This process does not require a lot of data, but in some cases, the telematics data can be used to diagnose the assembly and the various components being installed to ensure they are reporting their diagnostics correctly. For this reason, the telematics server may select a more comprehensive plan set allowing for more data on the telecom network through the SIM and more reporting frequency on the shop floor.

Once the assembly is complete, the vehicle typically moves into a manufactures stock yard, where it can find location info via a GPS signal and a possible geofence that is known by the telematics server. The vehicle may sit in this yard for some time before being transported to a dealer for sale, and thus the telematics server can reprogram the plan set to have a minimal amount of data to only report location daily or even less so.

While the vehicle may move around in the stockyard to make room for shifting inventory, once it leaves the geofence, the telematics server is notified and again reporting frequency is increased to show the vehicle moving on its transport.

Once arrived, a dealer may keep the vehicle in inventory and may select which plan they want to have. Some dealers may want a fully featured plan to be able to demonstrate the vehicle with its features that are dependent on the communications and may also want to have vehicle tracking in case of theft. Others may select a lower features plan with limited reporting.

Finally, once the vehicle is sold to the end user, some plan selections are made by the user enabling features that they want to have enabled on the device. This may include factory features to report location and diagnostics but may also include other applications such as tire pressure monitoring or video analytics etc. The end-user may pick up responsibility for payment for these advanced features.

In addition to plan selection, even within a given plan, the telematics server can optimize the timing and frequency of sending and capturing of data. For example, when parked, there is no longer a need to capture or send information about drive behavior or braking diagnostics.

If a firmware update, typically requiring a large amount of data transfer, is necessary, detecting that the vehicle is in the customer's garage and not likely to move may be an optimal time to schedule such an upgrade. These selections can be done to optimize costs, minimize disruption or impact to bandwidth availability to other users of the network in the car, but may also be simply a means of optimizing success. A firmware upgrade starting when a vehicle is moving though areas of bad coverage is likely to fail and require restarting or recovery.

The telematics device typically includes a SIM (Subscriber Identity Module) used to connect to a cellular network. This required paid plans, and various plan subscription options are available to the subscriber with varying cost depending on factors such as speed, amount of data, and functions available.

Costs can greatly be reduced by utilizing minimal plans at the early stages of the assembly line.

For example, the bootstrap initial plan can allow for only a minimal amount of data to be transferred in a given month lowering costs substantially. The speed of the data can also be limited to slower speeds again lowering costs.

Telematics Service Providers (TSPs) allow switching between plans and typically allow this in-month even while a plan is already activated. TSPs are particularly amenable to upgrading plans, as these can offer incremental revenues from their subscribers. AS the vehicle moves along the assembly line, into the stockyard and finally into the dealers' lot and eventual customer hands, the plans used at each phase are incrementally more functional and thus can be considered upgraded plans.

In the assembly line, one of the first steps is to install a SIM into the telematics unit, even before it is installed in the vehicle. These devices may come with pre-installed SIMs or may require the installation to be done by the OEM.

As vehicles move along the assembly line, the telematics units can capture additional signal information across the vehicle assembly line as new modules come online and these can be used to determine the progress of assembly. While the availability of GPS signals inside a factory floor may be limited, technologies such as triangulation, wi-fi or Bluetooth ranging, and beacons can be used to approximate location. These mappings in conjunction with knowledge about the factory floor can be used to better approximate the completion of the vehicle as it is being manufactured.

While the examples herein are specifically tailored to automotive manufacturing, with the proliferation of IoT connected devices in the market place this same model applies to a growing number of solution spaces. Take for example refrigerators that provide connectivity allowing for firmware upgrades, diagnostic information and possible telemetry like data depicting how these devices are used. Players such as the manufacturer, the store, potentially a landlord or host, as well as an end user are the players in such a scenario, but parallels can be drawn to the automotive related actors and this should not be considered limiting in any way.

What is desired then is a system and method that can manage communications plans and software application licenses in such a way so as to minimize costs and ensure adequate features for the various stages of a products lifecycle. The system can detect the phase of assembly through various inputs including location and various sensors obtaining the necessary knowledge to automatically select the appropriate plans.

The software program running on one or more computers/servers works autonomously and continuously in the background collecting data about telematics devices and their current usage. This software program may be knowledgably about the telematics devices, the assigned plans, and the Telematics Service Providers with which they operate, as well as the vehicles and the progress they are making in the assembly line.

In one embodiment, the system is able to access the vehicles diagnostic data through a software portal provided by the Telematics Service Provider that supplies the plans for data usage. The plan information can thus be gathered for the vehicles and various options can be chosen for auto-configuration by the onboard vehicle system.

In another embodiment, the system can interact with the devices in order to query diagnostic information and update firmware of each device.

In yet another manifestation, the system can interact with an agent or application, or function on the device itself to gather specific diagnostic equipment about a module.

While the offerings vary between telecom service providers, there are generally many plan options available to individual devices, typically with increasing cost as features and data limits increase.

The system selects 2 or more plans for configuration at various stages of the assembly line.

In one embodiment, the system looks for the first boot up of the system to occur, and provisions the default, and lowest cost plan allowing it to communicate with the central system.

Once communication is established, the vehicle sends identity data and thus also confirms connectivity and thus functionality of the telemetry module to the telematics server. The OEM's assembly line operator can detect this in a dashboard view as a red or green light to indicate lack of communication or successful transmission of this first event.

Once communication is established, the system downloads the then current programming requirements which includes instructions to the system about what diagnostic information to collect, and how often, which plans are to be used and when to switch between them.

In another embodiment, the telematics device looks for location information using beacons, GPS, and Wi-Fi signal strength another means and combined with information about the plant layout can detect which part of the manufacturing is being performed.

As components are added to the vehicle and these come up, the device also receives diagnostic data which can be captured and sent to the central telematics server for diagnostics. This ability removes the need for custom test jigs providing communications and transmission of this data and simplifies central gathering of this information.

In yet another embodiment, the systems will also optimize the timing of uploads and reprogramming of the system through the application of machine learning and historical data to predict movement and connectivity or bandwidth availability. As firmware downloads can be lengthy and can interrupt normal operation, the timing of these is important.

Figure 1A:
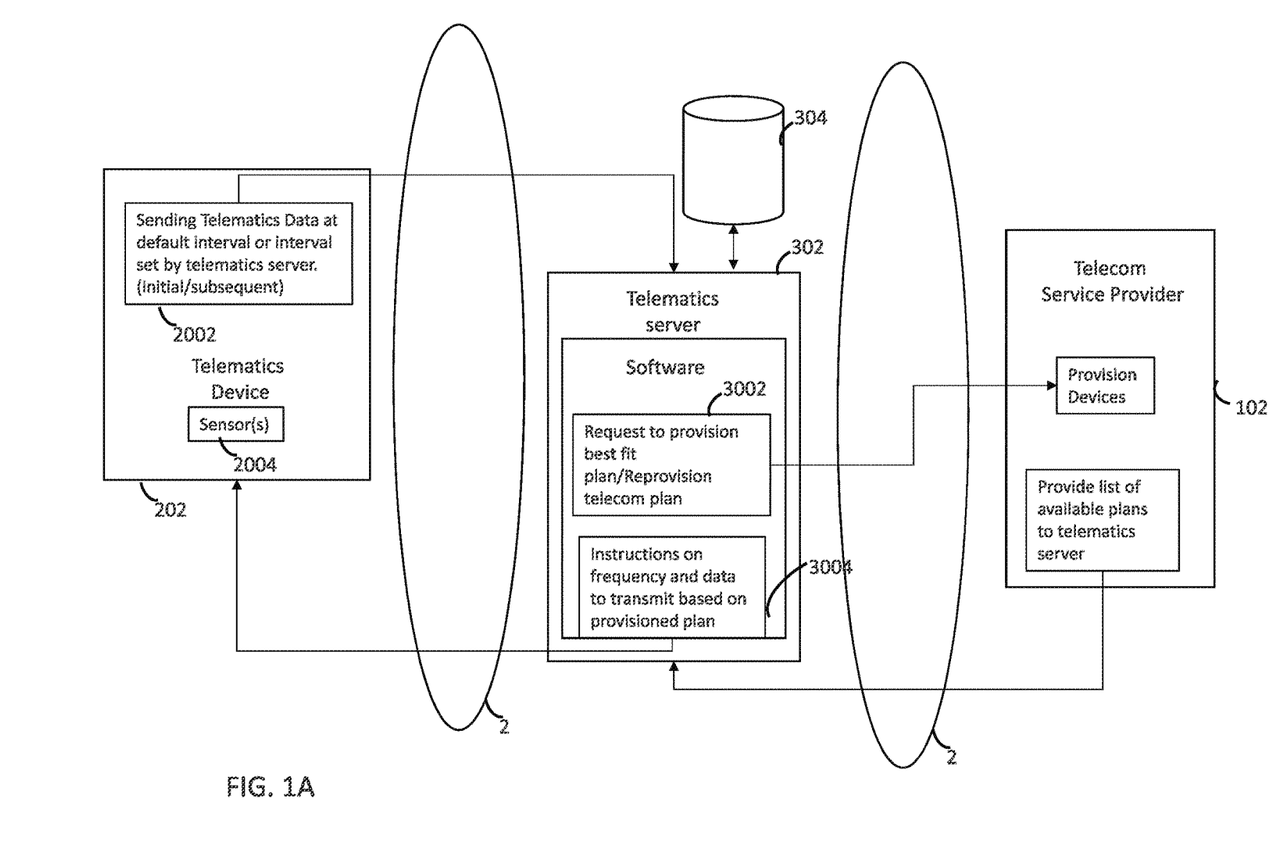
FIG. 1A Shows a functional flow diagram according to the present invention.

Turning to the drawings, FIG. 1A shows a Feedback Loop between the telematics device, telematics server and Telecom service provider. The Telematics device (202) initially sends default data at a default interval to the telematics server (302) based on the configuration given to it when assembled and shipped. The address required to connect with the telematics server and is configured when the telematics device is assembled and shipped by the device manufacturer.

When the telematics server (302) received the initial communication (2002) from the telematics device (202) it knows that the device has been powered up and that the manufacturing process of the vehicle into which the telematics device (202) is installed has begun. This may be considered confirmation of connectivity in that the device is connected and sending data. The initial settings for the initial communication may also send various sensor diagnostics, but most of the time the initial communication will be as minimal as possible, simply enough to confirm the device is connected. Depending on the plan provisioned, instructions (3004) are sent to the telematics device (202) to change what subsequent communications (2002) will include or the context under which communications are sent. For example, the telematics device includes a number of sensors (2004) which provide data for the telematics device (202) to send to the telematics server (302). These sensors may include engine sensors such as oil temperature, pressure, fuel flow, pressure, exhaust gas temperatures, cylinder temperatures, coolant temperatures or any other sensors which could be employed with an engine or other systems of the vehicle. The sensors (2004) can also include e.g. GPS hardware to determine the position of the Telematics Device (202). A wide variety of other sensors are contemplated including engine monitoring and other vehicle behavior. These might include exhaust gas temperature, cylinder head temperature, oil temperature/pressure, fuel flow/pressure, manifold pressure, throttle position, RPM, speed, braking activity, slipping sensors (i.e. activation of traction control), acceleration, other engine fault diagnostics.

The telematics server (302) receives available plans from the telecom service providers (102) and is thus able to choose the most appropriate plan to be used by the telematics device based on the stage of manufacturing for that device. The telematics server (302) maintains a storage (304) which has information concerning the various identifiers of the telematics devices such as SIM, IMEI and other known identifiers and then an associated plan. The storage also stores information concerning current instructions (3004) under which each telematics device is operating. The telematics server (302) will provision the appropriate plan with the telecom service provider (102) and will instruct (3004) the telematics device (202) to send the appropriate parameters at the appropriate interval based on the plan selected.

This continued until the telematics server (302) detects that the telematics device (202) installed in the vehicle. Usually based on a report from the telematics device (202) indicating that the vehicle is in a new stage of manufacturing which would require a different plan. For example, GPS data may be received and compared with a geo fence to see that the device is now outside in the stockyard. Alternatively, diagnostic data may be received and reported indicating that additional modules have come online in the assembly process. Any number of parameters can be combined and acted upon by the telematics server (302) to make such a determination.

If it is determined that a new plan (3002) and/or new instructions (3004) are required, again the telematics server (302) provisions a new plan from the available plans with the telecom operator (102) and then instructs the telematics device (202) to send a new set of parameters at a new frequency. This is done so as not to have the device create data overages for small data plans and also to send the appropriate parameters for the telematics server to have the information it needs to make the next determination. For example, GPS data may be requested as the device nears the end of the manufacturing cycle upon which time, we will make a plan decision when we see the device exit into the stockyard. At that time, it is no longer important to send diagnostic data from various systems which have already been diagnosed and determined to be in working condition as the vehicle has completed its assembly and is now awaiting transportation to a dealer lot.

Figure 1B:
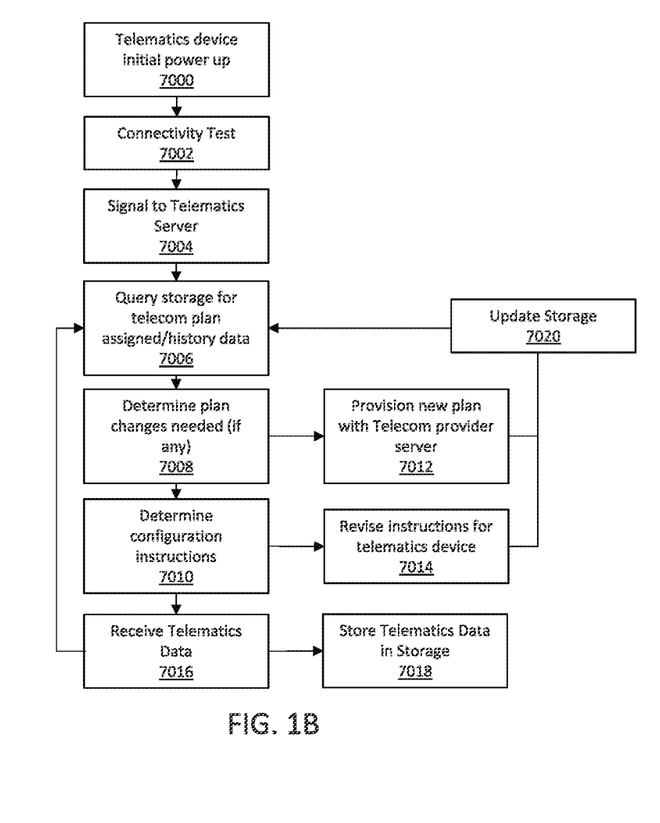
FIG. 1B is a flow chart showing the process of selecting telecom plans and/or instructing telematics devices on reporting rules.

FIG. 1B shows further detail on the logic/process for configurating the telematics devices as operated primarily by the telematics server software. On initial power up 7000 a connectivity test 7002 will be performed. This is typically done by the manufacturer of the telematics device prior to shipping to the product manufacturer (e.g. vehicle manufacturer, refrigerator manufacturer etc). A signal is sent to the telematics server 7004 since the telematics device is pre-programmed to address the telematics server. On initial power up, a bootstrap plan will be (or may already be) assigned to the SIM of the telematics device. This plan provides for limited functionality and data. This bootstrap plan may be a pooled bootstrap plan where the telematics device manufacturer has e.g. 1 million SIMs on a very small plan such as 10 gb (for all SIMs). The signal 7004 confirms connectivity and which device the signal came from, usually by very minimal text exchange, but possibly more information. When the telematics server receives the signal it will query the associated storage to determine what plan is assigned 7006. The connectivity test may be more extensive and thus a relatively large amount of data may be used quickly (compared to the overall proportional allowed amount per SIM). But, then the telematics server and its associated software will want to scale back the data use. Thus, knowing the plan assigned 7006 may be important or this may be assumed or known from the context of the signal (e.g. first time the device has contacted the telematics server). Based on the plan and the signal received and the context of that data, the next steps involve determining if plan changes are needed 7008 or if different configuration instructions 7010 are needed (or both). The new plan typically involves an upgrade or downgrade in the data plan and then configuration instructions 7010 will be sized to match. In other cases, it is known that post the last signal that very minimal communications are needed and possibly that the bootstrap plan will continue to be adequate. In this case, instructions 7010 are sent to the telematics device which can be seen as rules for how that device communicates with the telematics server. This may involve frequency-based rules such as every week or once per day or every ignition activation as examples. The ignition activation may be an example of a change in state of the vehicle as may be the movement of the vehicle to a different location or different geofence area.

When the plan and/or instruction updates are determined, the telecom server is contacted 7012 as is the telematics device 7014. Next, an event will occur that causes telematics data to be received 7016 based on the instructions the telematics device is operating under. These instructions may also be considered rules. The data received may be same fields as the signal 7004 or may include more information than the signal 7004.

These instructions will be tailored to what the next step(s) the vehicle/device will go through. They are also tailored to identify when the vehicle has entered a new state/stage of the manufacturing/supply chain process. For example, a large change in location after there was an ignition event may indicate the vehicle is now being transported and that it may be beneficial to track this transportation via GPS signals and associated relay of telematics data. In an alternative manner, various other information from the telematics device can either alone or in combination provide context data which can be interpreted by the software to determine the next actions in terms of telecom plan and instructions. Each time telematics data is received it is stored in the storage 7018. This stored data may also be part of the context data used to determine the plan and instructions. Throughout the manufacturing and supply chain process, the plan and/or instructions can be updated multiple times. Typically, at least two or three or four or more times.

Each time there is an update to the instructions/plan, the telematics server storage 304 is updated 7020. This update also provides further context and history to indicate what stage of the manufacturing/supply chain the vehicle is. Thus, after receipt of telematics data 7016, the query process can look to historical events associated with the device/usage and plans to provide further context as part of the context data for making decisions on subsequent plans/instructions. Accordingly, the process will repeat as additional telematics data 7016 is received in accordance with the reporting frequency and scope that is based on the instructions 7010. However, it is understood that in many cases the additional telematics data 7016 will not cause a change to the instructions or telecommunications plan. For example, if the vehicle is sitting in a staging lot for a month and the telematics device is programmed to report every day, each report will cause no change because nothing has changed for the vehicle and its context. However, if the vehicle exits the geo-fence, this may trigger a report or the next day's report will show the vehicle has left the geo-fence and this will change the context and thus change the configuration instructions 7010 and/or the plan 7008. In each case where there are instruction or plan updates, the instructions are matched to the provisioned plan. As part of the provisioning process 7012, the telecom server will often send back a confirmation signal to the telematics server, thus confirming the request to the plan has been accomplished, thus the storage is updated 7020 after such a signal is received and the instructions update 7010 for the new plan will also be pushed to the telematics device 7014 once the plan update is confirmed. Again, the telematics device may send back a signal confirming to the telematics server that the instructions update has been received and implemented before the storage 7020 is updated to reflect the update. In many cases, this order can be important in that if the instructions were updated prior to the plan change, this could cause significant overages—especially if migrating away from a bootstrap plan.

Further, the instructions are always matched to the plan and may be based on pooling assumptions. For example, a pooled bootstrap plan or another pooled plan may be appropriate for all devices throughout the manufacturing and supply chain cycle but that usage can be controlled to remain below the pooling allotment by carefully crafting and distributing the instructions 7010 based on context of all vehicles under the pooled plan. Basically, the vehicles that are stationary at the staging lot will not use much data and will fall well below the average data per device available under the pool. But, since a pool plan is provided, these below average users of data open-up the ability for other devices to be instructed 7010 to be above average users—thus even out the overall usage across multiple devices to be below the pool limit. In most cases, the instructions 7010 will be set with a particular threshold in mind that is based on the assigned telecom plan. In a single device single limit plan, the threshold will typically not be dynamic, and the system will rely more on changing plans and then giving matching instructions. However, with pooled plans, the need to change plans will be less but the need to provide instructions based on varying thresholds that depend on context will be more important.

Figure 2:
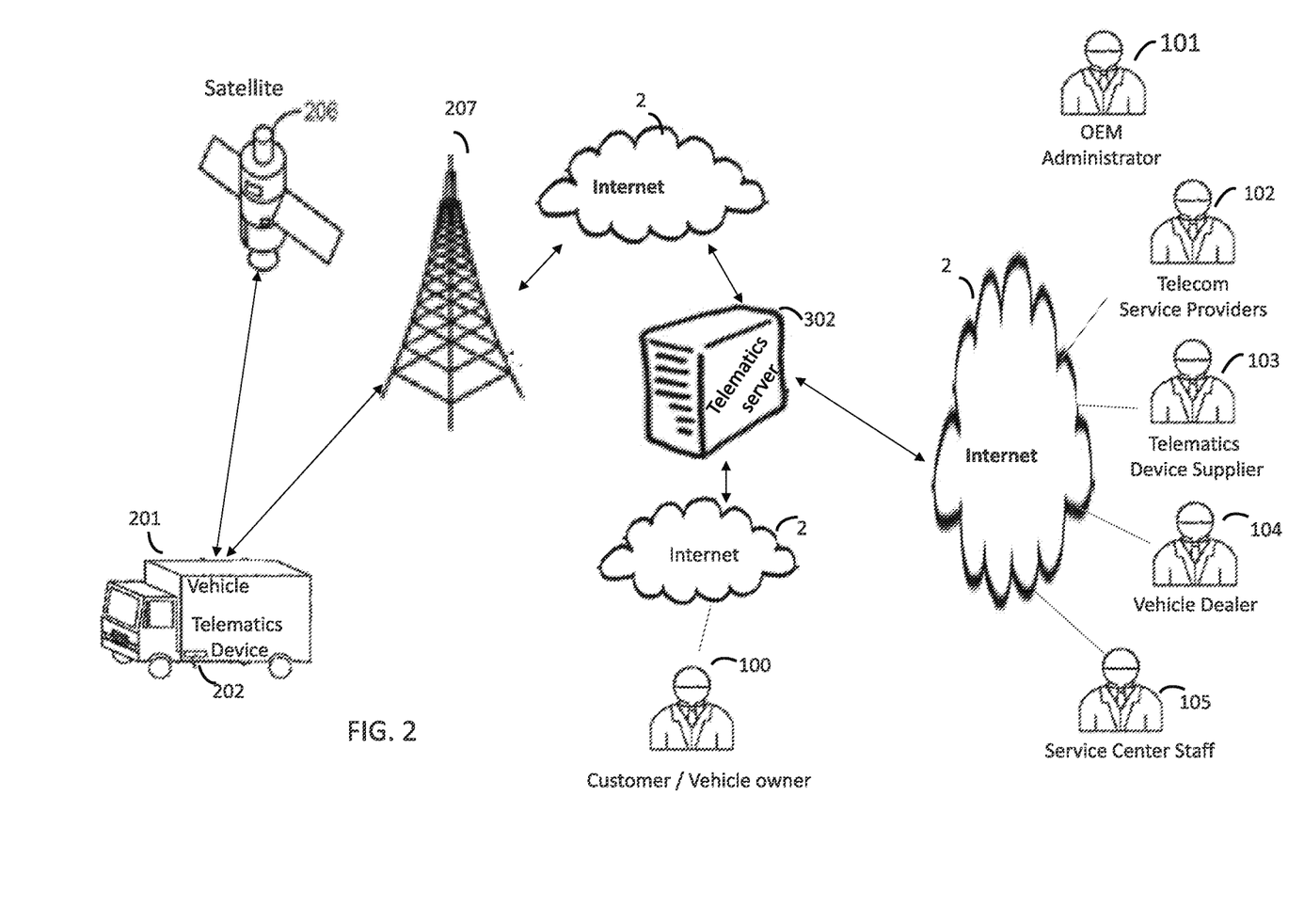
FIG. 2 is another functional flow diagram of the system of FIG. 1A/B.

Turning now to FIG. 2, we see an overview of the overall system and the various players involved during and after the installations of the telematics device (202) into a vehicle (201) to provide context. A telematics device (202) is installed in a vehicle (201) and obtains GPS signals from GPS satellites (206) in order to determine the vehicles position. The telematics device (202) in the vehicle (201) then sends telematics data, including this positioning data over a cellular, or other, network (2) using the cellular, or other, antenna (207) to reach a Telematics server (302) over the internet (2).

A vehicle owner (100) is able to connect to the telematics server (302) over the internet (2) to obtain and view this GPS and vehicle data as well as to provide provisioning functions.

Figure 3:
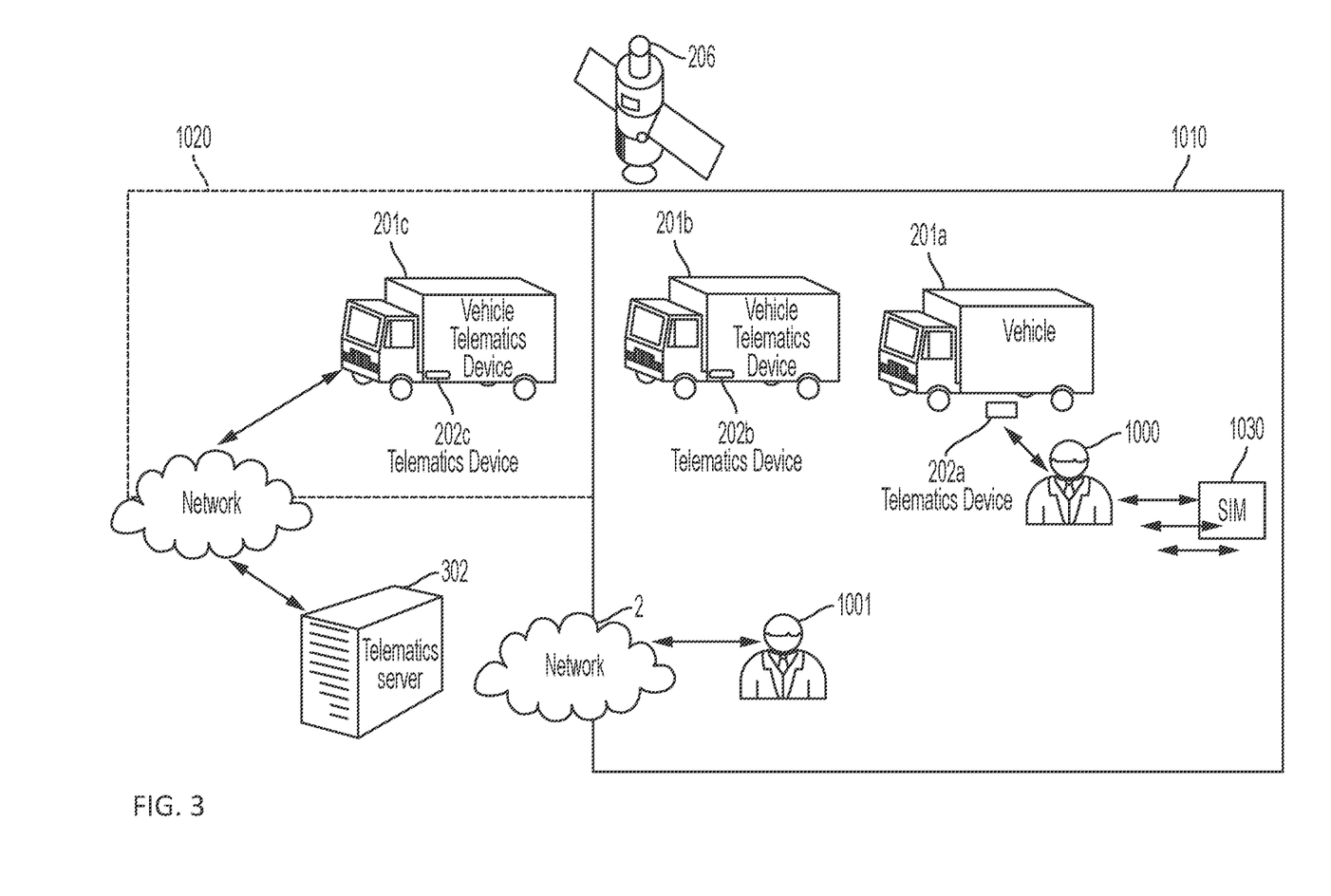
FIG. 3 is another functional flow diagram showing exemplary assembly line of vehicles being fitted and provisioned with telematics devices.

Turning now to FIG. 3, we see an exemplary assembly line of vehicles being fitted and provisioned with Telematics devices.

Vehicles (201*a*, 201*b*, 201*c*) move along an assembly line inside a factory floor (1010). A technician (1000) installs telematics devices (202) into vehicles (201*a*, 201*b*, 201*c*). In the depiction, vehicle 201*a* is having the telematics device (202*a*) installed. Vehicles 201*b* and 201*c* have their telematics devices, 202*b* and 202*c* respectively already installed.

The technician 1000, installs these and configures them for operation with the appropriate SIM (1030). The vehicles then move along the assembly line, as depicted with vehicle 201*b* which already has its telematics device (202*b*) installed. Other operations are performed on these vehicles to bring them to a finished state (not shown and not applicable).

Once all operations are complete, vehicles exit the factory interior (1010) into the exterior stockyard (1020) where they have access to GPS signals from satellites (206) as well as access to the internet (2). The stockyard (1020) or another defined location may form a geofence and when the vehicle enters or leaves the geofence, the instructions (3004) to the telematics device will change and accordingly the internal programming of the telematics device in terms of reporting frequency and what to report (2002) will also change. Reporting frequency could indicate a certain time period such as once per day or other time periods and/or this frequency can also indicate under what circumstances the reports 2002 are sent. For example, if the ignition is turned on, this may cause a report to send. If the vehicle is moved out of the geofence 1020, this may cause another report. In response to these reports, the telematics server and its software Another technician (1001) connects to the telematics server (302) via the network which may be the internet (2) to validate that the telematics device (202*c*) is connected, obtaining signals, and providing telematics data to the telematics server (302) as expected. Once verified, the vehicles (201*c*) can now be moved and tracked from the factory stockyard to dealer locations and to end customers. It is understood that the network 2 may comprise a wide variety of networks including but not limited to public or private internet, cellular networks, satellite networks and others.

Figure 4:
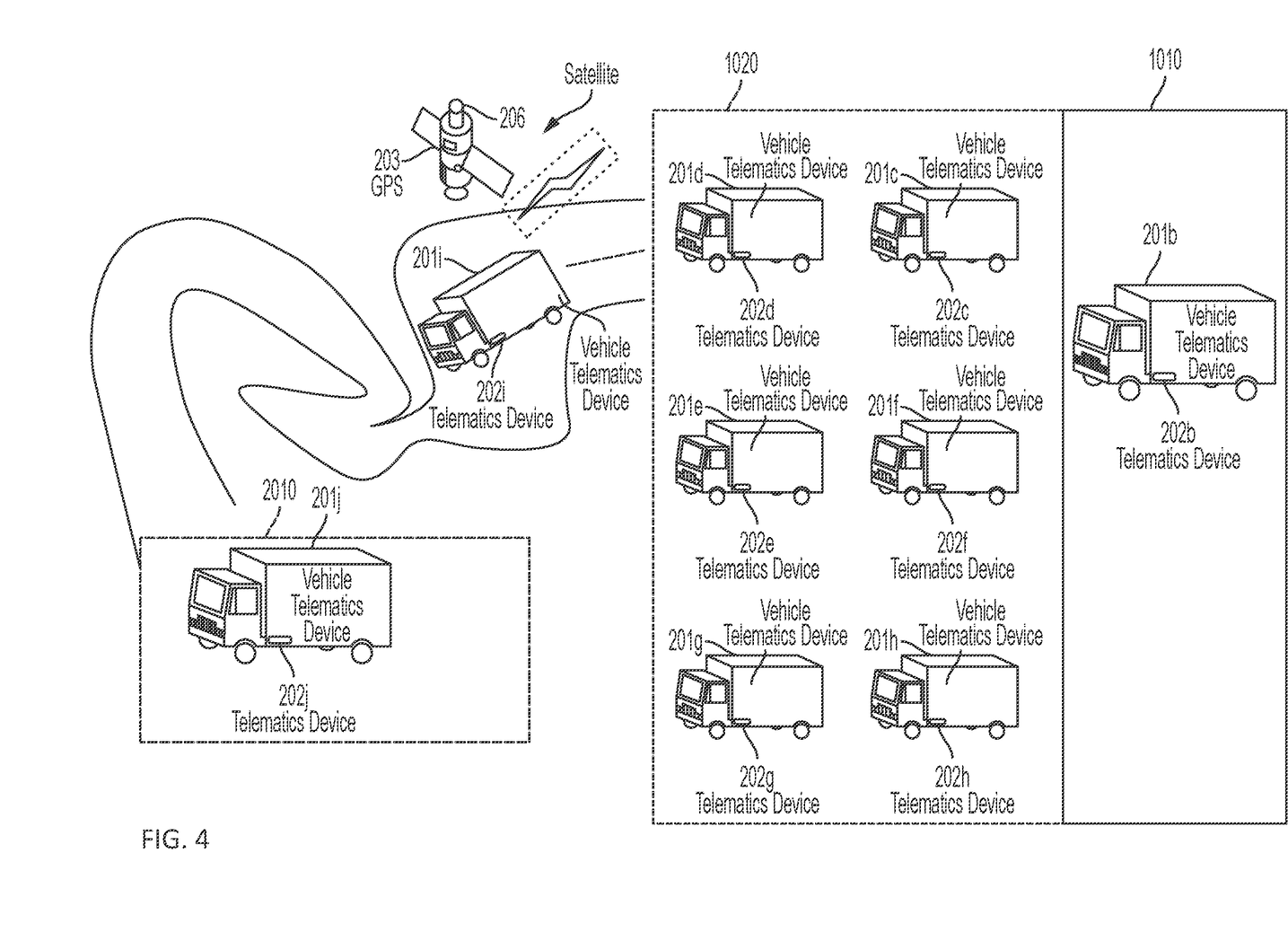
FIG. 4 shows the process of vehicles moving in and out of various geo fence zones.

Turning now to FIG. 4 we see Vehicles moving to dealer locations. Vehicle 201*b* is still shown inside the factory interior (1010) undergoing the final assembly steps. Vehicle 201*c* is shown newly entered into the stockyard (1020) where the installed telematics device (202*c*) was tested and verified to be operational.

Vehicles (201*d*-201*h*) have also been verified as was vehicle (201*c*) and as such their telematics devices (201*d*-201*h*) are also operational and ready reporting GPS data and telematics.

We see vehicle (201*i*) leaving the factory stockyard and its telematics device 201*i* is obtaining GPS data and able to report its position on the road.

The telematics device (201*i*) is programmed to detect this motion and based on the location the telematics server able to select the appropriate telecommunications plan and provision the SIM for optimal cost and/or to instruct 3004 the telematics device to communicate in a way that avoids overages for the provisioned plan.

We also see vehicle 201*j* which as arrived at a dealer lot (2010) and its telematics device (202*j*) can report this location and the telematics server can then track when the vehicle moves or is sold to an end customer and leaves the lot. The telematics device (201*j*) is programmed to detect this arrival and based on the location it is able to select the appropriate telecommunications plan and provision the SIM for optimal cost as well as instruct 3004 the telematics device on communication frequency and data to include in reports. Further, once at the dealer lot, dealer technicians can configure the SIM for the end customer when the vehicle is sold.

Figure 5:
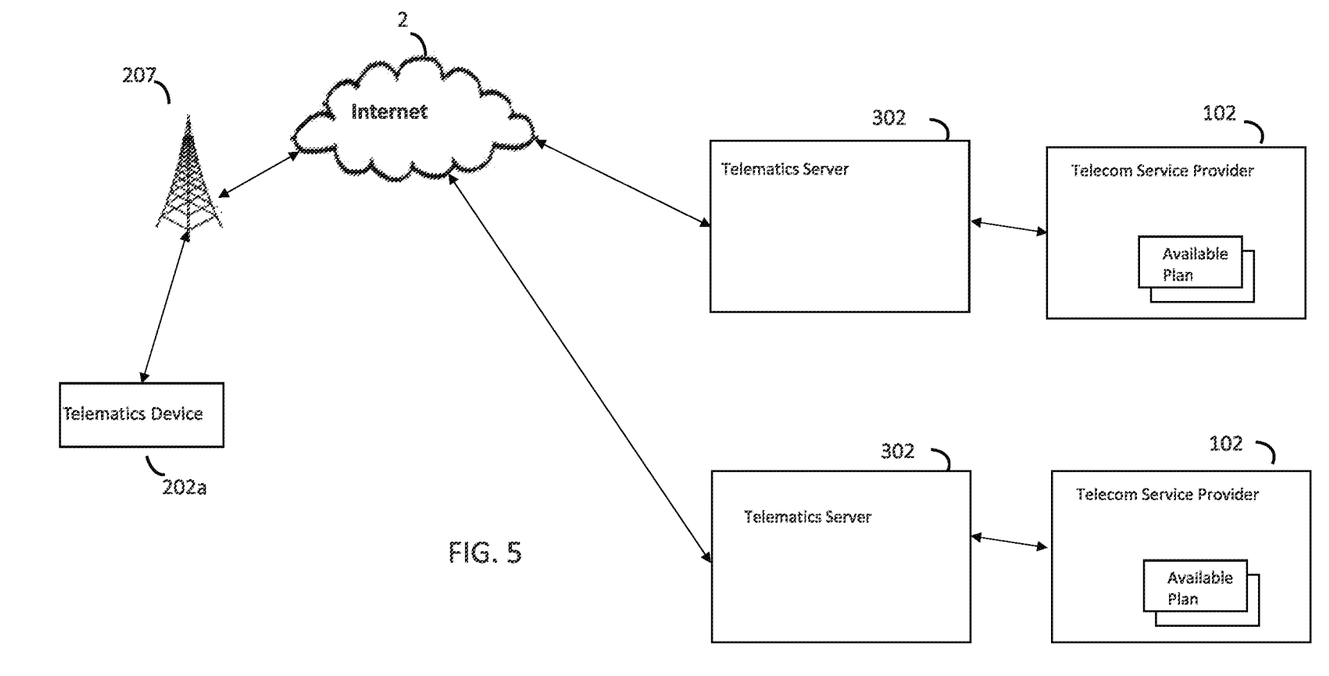
FIG. 5 is a functional flow diagram for initial and subsequent plan selection and provisioning.

Turning now to FIG. 5 we see the initial plan provisioning. When telematics devices (202*a*) leave the factory, they are preprogrammed with a basic communications plan from a telecom service provider (102). Additionally, the telematics server's (302) address is programmed into them so that on power-up they initiate this communication with the known telematics server (302) using a default plan.

The communications channel is always established by the end device (202*a*), and not from the server (302). Due to dynamic IPs in the mobile network, the server itself is not able to initiate communications or determine if a device (202*a*) is present. For this reason, the server (302) awaits the device (202*a*) initiated connection and responds with instructions in the reply to the device's message, on a TCP connection established by the device (202*a*). Plan-change determinations are made by the server and queued up to be sent on the next device connection, or in some cases during the same connection.

In some cases, devices (202*a*) are often dual profile sims allowing multiple Telecom service providers (102) to be used. Information such as signal strength and various roaming partner lists are used to make the determination to optimize costs. In certain cases, being close to international borders where a stronger signal may come from an international roaming partner, is it increasingly important to ensure that the partner list and preferred TSPs are retained to avoid unnecessary and expensive roaming charges.

Newer e-sims may also allow switching between many international, in some cases all international, TSPs. Some SIMS offer such a service which allows use across all networks.

The type of SIM system does not affect the functioning of the system and the described system and method would look at an increased selection of plans available whether from one TSP or multiple TSPs. The logic around cost and plan selection are built into the telematics servers and form part of the logic used to select plans.

In the above scenario, the communications path has been established between the device (202a) and the telematics server (302) using a known telecom service provider (102) compatible with the SIM. Regardless of the initial plans selected, the communication channel is now open, and the server (302) can provide instructions to the device (202a) to make different plan selections.

The telematics device (202a) is configured to send end-of-line test results along with its location in the factory upon first connection in the assembly line to the telematics server (302), wherein the location data from the telematics device is used) to configure data parameters which in turn determine exchange interval and payload of data between the device and server.

The exchange interval and payload of data are based on whether the vehicle is in the assembly line or in the OEM stockyard or at dealer location, the data exchange interval and payload altered for optimal use of vehicle's battery power and SIM data plan usage when the vehicle is parked for months together in the OEM or dealer stockyard waiting for sale to the customer. The invention also comprises a telematics service activation method for use in the automotive assembly line, comprising of steps:

(a) telematics device (202) is configured to send end-of-line (EOL) testing results including its location, IMEI, SIM and the fitted vehicle's identification number (VIN) to the telematics server (302)

(b) create the vehicles on the telematics server (302) based on the details received from the device; assign the device IMEI to the VIN; checks and updates IMEI and SIM mapping.

(c) based on vehicle's location, alter the data exchange interval to optimize battery consumption; for example, configure for longer exchange with reduced payload when vehicle is parked in the factory stockyard for long periods.

(d) based on vehicle's location alter the payload for reduced data usage when the vehicle is parked in the stockyard for long periods.

(e) interface with the OEM's dealer management systems (DMS) to gather customer details.

(f) organize the vehicles on the telematics server (302) based assignment to dealer or customer (g) telematics device (202) configured to send its assigned VIN and SIM numbers in a periodic basis for inventory upkeep on the server.

(h) telematics device (202) configured to reset its data exchange interval and payload based on configuration parameters assigned by the telematics server.

Additionally, the end-of-line testing method for a telematics device (202) as defined above, wherein step (a) further comprises just-in-time SIM activation prior to testing and its suspension after posting results to the server (b) interface to the telecom service provider for dynamically changing SIM state and data plan based on vehicle's location.

Figure 6:
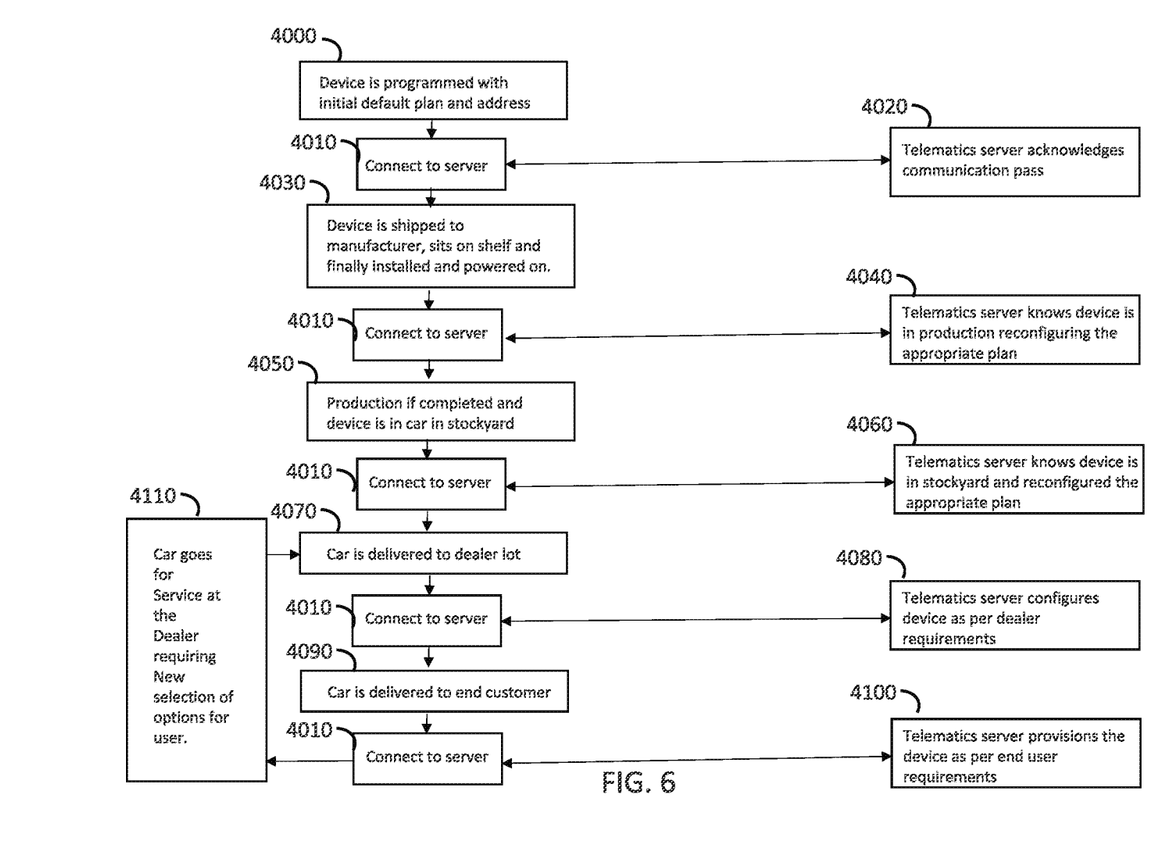
FIG. 6 is a functional flow diagram showing programming logic in the plan selection methods.

Turning now to FIG. 6, we follow the logic of provisioning in a typical device's lifecycle from manufacturing, through installation, to an end user.

At the device manufacturer, the device is programmed (4000) with a default plan and address to test connectivity. A connection to the server (4010) is made and the telematics server (4020) acknowledges the communication demonstrating that the communication path works. This allows the device to packages and shipped (4030) to the vehicle manufacturer as a known working device.

After being shipped (4030) to the manufacturer it may sit on the shelf for some time before it is installed in a vehicle and powered on for the first time. This powering on again initiated a transmission to the server (4010) and the telematics server now knows (4040) that the device has been installed in a vehicle and is in the production line. An appropriate plan and/or instructions are configured based on the amount of data expected to be used during the process, this may vary depending on the device and application. This plan may be a suspend option to disable the SIM, and the SIM will be reprovisioned on the next step. For a refrigerator, it may be a day, for a car it may be a month, for a plane it may be a year or more. Alternatively or in addition to the plan provisioning, instructions 3004 will go to the telematics device concerning reporting frequency and data to include. This avoids unwanted overage charges and also may ensure that previous instructions for very limited data transfer are modified so the telematics device can provide more robust data as needed, of course depending on the data needs for a particular context/location of the vehicle/device in the manufacturing line.

With a growing based of 5G deployments, more and more features are available which are bandwidth hungry and increasingly make such a plan optimization system important. For example, school buses, taxis and emergency vehicles may have video streaming capabilities with the final configured options. Voice, Video are all bandwidth intensive and becoming more prevalent.

When production is finished (4050) the device sensors may receive GPS or detect a geofence along with a complete known set of sensors indicating that the manufacturing process is complete. This is sent to the server (4010) and again the telematics server (4060) can now select an appropriate plan and/or instructions for the next phase, in this case, sitting in the stockyard awaiting order and delivery.

When the car is delivered to the dealer lot (4070) the device sensors detect the exiting of a geofence and the movement and connect again to the telematics server (4010) whereby a new appropriate plan (4080) is configured and instructions on reporting frequency and data to report are also configured on the telematics device. This may be selected by the dealer depending on needs such as wanting to demonstrate fully functional features and monitor the inventory location.

When the vehicle is sold (4090) and delivered to the end user, the telematics server will configure the appropriate plan (4100) based on the features selected by the end user and may allow the user to also set instructions and limits for usage to avoid overages. This configuration may remain for a long time, may be part of a trial which may automatically change after a period of time. The end user also has the option to return to the dealer (4110) and have the options reprogrammed (4080) by the telematics server.

It is understood that although some specific examples as to vehicles are presented herein, the scope of the disclosure is not limited to vehicles only. For example, many common household devices are more and more becoming equipped with communication capabilities which may be useful to track both during the supply chain and afterwards. For example, diagnostic data on refrigerators may be helpful to know that a refrigerator is not operating optimally and to alert the manufacturer/owner that service is needed and possibly to arrange service from a qualified provider.

While the invention is susceptible to various modifications, and alternative forms, specific examples thereof have been shown in the drawings and are herein described in detail. Is should be understood however that the invention is not to be limited to the particular forms or methods disclosed but to the contrary, the invention is to cover all modifications, equivalents and alternatives falling within the scope of the disclosures and/or claims.

What is claimed is:

1. A system for modifying telematics device behavior comprising:
    a server having software executing thereon which is configured to communicate with a plurality of telematics devices over a network, said software in communication with a storage and further in communications with one or more telecommunications provider servers, said storage containing data indicative of the plurality of telematics devices and associated telecommunications plans for one or more of said plurality of telematics devices;
    each of said plurality of telematics devices is capable of measuring and transmitting data from a plurality of sensors;
    said software receiving a signal from one or more telematics devices prior to being installed in a vehicle, the signal indicative of a power up of the one or more telematics devices;
    after said software receiving the signal, said one or more telematics devices conducting a connectivity test prior to being installed in the vehicle and said one or more telematics devices thereby transmitting a second signal and said software, in response to said second signal, sending instructions to the one or more telematics devices, the instructions indicative of one or more of: data for the one or more telematics devices to transmit and frequency of transmission.

2. The system of claim 1 wherein the frequency of transmission associated with the instructions is further indicative of one or more conditions to cause transmission of data from said one or more telematics devices to the server.

3. The system of claim 2 wherein the one or more conditions is selected from the group consisting of: the telematics device has left a geo fence area, the one or more telematics devices are connected to power after an internal battery was previously emptied, the telematics device has entered a known geo fence area, a GPS device of the telematics device indicates movement more than a threshold speed and combinations thereof.

4. The system of claim 1 wherein in response to said signal said software provisions said one or more telematics devices with a telecommunications plan by communicating with one of the one or more telecommunications provider servers, said software associating the telecommunications plan with the one or more telematics devices.

5. The system of claim 4 further comprising:
    said software receiving a second signal from the one or more telematics devices, the second signal indicative of the one or more telematics devices having been installed in a vehicle and said software, based on said second signal, provisioning the one or more telematics devices with a second telecommunications plan and said software sending second instructions to the one or more telematics devices to revise the instructions concerning data for the one or more telematics devices to transmit and frequency of transmission, the second instructions matched to the second telecommunications plan to inhibit the telematics device from using data beyond that which is allotted by the second telecommunications plan.

6. The system of claim 5 further comprising:
    based on data received from the one or more telematics devices via said network at the server, said software sending third instructions to the one or more telematics devices, the third instructions revising the second instructions concerning data for the one or more telematics devices to transmit and frequency of transmission.

7. The system of claim 6 wherein a new telecommunications plan is provisioned with the one or more telematics devices after the software receives confirmation indicating that the one or more telematics devices is operating based on the third instructions.

8. The system of claim 1 wherein the one or more telecommunications devices is provisioned with a bootstrap plan or a pooled bootstrap plan.

9. A system for modifying telematics device behavior comprising:
    a server having software executing thereon which is configured to communicate with a vehicle telematics device over a network, said software in communication with a storage and further in communication with one or more telecommunications provider servers, said storage containing data indicative of the vehicle telematics device and an associated first telecommunications plan for said vehicle telematics device;
    the vehicle telematics device is capable of measuring and transmitting data from a plurality of sensors, said data including position data from a GPS device and vehicle data and transmit information to the server with a reporting frequency, the information including data from at least one of the plurality of sensors;
    said software receiving a signal from the telematics device, the signal indicative of one of the plurality of sensors detecting a change in state of a vehicle in which the telematics device is installed and based on the change in state, the software sends instructions to the telematics device such that the telematics device transmits and the server and software receives second information from the telematics device with a second reporting frequency and the second information including data from at least two of the plurality of sensors which of the second information from the at least two of the plurality of sensors includes data from at least one of the plurality of sensors which is not included in the information;
    based on the change in state said software provisions said telematics device with a new telecommunications plan by communicating with one of the one or more telecommunications provider servers, said software associating the new telecommunications plan with the one or more telematics devices in the storage and the new telecommunications plan having a higher data limit than the associated first telecommunications plan, the new telecommunications plan is matched by said software to the one more telematics devices based on the second reporting frequency and the information received with that second reporting.

10. The system of claim 9 further comprising:
said software provisioning the telematics device with the new telecommunications plan by communicating with one of the one or more telecommunications provider servers, the new telecommunications plan selected based on a selection indicative that an end user has taken delivery of the vehicle.

11. The system of claim 10 wherein the selection is received from a vehicle dealer.

12. The system of claim 9 wherein the first telecommunications plan is a bootstrap plan.

13. The system of claim 9 wherein the change in state is indicative of the vehicle's engine being turned on and a change in position of the vehicle as determined by a GPS.

14. The system of claim 9 wherein the change in state is indicative of a change in position of the vehicle as determined by a GPS which is more than a predetermined distance or more than a predetermined distance relative to a time between two reports according to the reporting frequency.

15. The system of claim 9 wherein the change in state is indicative of a change in position of the vehicle as determined by a GPS to a position outside of a geofence.

16. The system of claim 9 wherein the first telecommunications plan is provisioned while the vehicle is parked in a parking lot prior to transportation, a second telecommunications plan is provisioned while the vehicle is transported and a third telecommunications plan is provisioned after transportation to a dealer.

17. The system of claim 16 wherein while the first telecommunications plan is provisioned, the reporting frequency is no more than three times per 24 hour period and the data excludes information from a majority of the plurality of sensors.

18. The system of claim 16 wherein based on GPS information of the vehicle delivered to the end user and an amount of usage of the third telecommunications plan, the software determines a fourth telecommunications plan which has a reduced cost compared to the third telecommunications plan and the software communicates with the telecommunications server to provision the fourth telecommunications plan.

* * * * *